July 21, 1959  F. BADIN  2,895,580
POWDER COUPLING
Filed Sept. 3, 1957

INVENTOR.
Ferdinand Badin
BY William Fox,
Attorney (United States Patent Office — 2,895,580 — Patented July 21, 1959)

2,895,580

POWDER COUPLING

Ferdinand Badin, Paris, France, assignor to Societe Mediterraneene Metallurgique Miniere et Commerciale, Paris, France, a corporation of France Application September 3, 1957, Serial No. 681,691

Claims priority, application France September 3, 1956

3 Claims. (Cl. 192—58)

Powder couplings are already known which permit automatic clutching between a driving and a driven shaft.

In these known couplings the powder is contained in a housing fastened to one of these shafts, which housing also contains a concentric rotor in the form of a disc or ring mounted on the bearing of the said housing which is fastened to the other shaft, and examples are shown in my co-pending United States patent applications, especially Serial No. 461,855, filed October 12, 1954, now Patent No. 2,813,606, granted November 19, 1957.

These couplings necessitate accurate alignment between the driven and driving shafts unless there is a flexible coupling between the housing or rotor and the driven or driving shaft.

Actually in these known couplings, once they are engaged the powder creates a practically solid mass which rigidly connects the rotor and the housing and does not permit, while operating, any change in relative position between the rotor and the housing. Such variations would furthermore be impossible due to the existence of the bearings which locate the rotor inside the housing. Moreover, the protection of these locating bearings against the powder itself requires seals which effectively separate these bearings from that part of the housing which contains the powder.

The present invention has as its object a method of coupling which remedies these disadvantages.

According to this invention the device comprises a housing of which the width and the axial cross-section diminishes towards the periphery, this housing being supported by at least one bearing positioned outside the housing (which can be the bearing of the motor) and within the said housing metal shot and a disc, fundamentally flat, attached to the central hub by elastic members, the said hub being also supported by at least one bearing outside of the housing (which can be the bearing of the input shaft of the driven machine) while a flexible sealing material closes the space between the said hub and the opening in the housing through which the hub fits.

Thus, due to the flexibility of the elastic members between the hub and the disc, the external bearings supporting respectively the rotor and the hub no longer have to be accurately aligned for the transmission of rotating movement (by the action of the shot and the disc) between the housing and the hub. Moreover the bearings are outside the housing and are thus protected from the shot.

The shot used in the device according to the invention are preferably constituted by calibrated metallic granules hard and spherical in which the diameter is greater than 0.2 millimeter. Such a dimension of the granules presents the advantage of facilitating the manufacture of the sealing material.

However, the principal advantage of the use of this type and size of shot is to avoid under the action of centrifugal force a sort of solidification which would rigidly connect the disc to the housing. Because of the spherical shape of the granules with shot of this size there exists during operation a slight slipping between the disc and the housing (slip between one per 1,000 and one per 10,000 revolutions for example) which does not have any practical effect on the efficiency of the coupling but which permits a certain freedom of relative motion between the housing and the disc.

This freedom is added to the action of the elastic members to permit the operation of the coupling in an unaligned position of the shafts of the housing and the hub, which is to say the driving and driven shafts.

Moreover, this slipping in conjunction with the presence of the elastic connecting members avoids the transmission of vibrations between the shaft connected to the housing and the shaft connected to the hub i.e., delivers vibration-free power. This is an extremely important feature with certain driving units which generate torsional vibrations, such as large diesels.

This slight permanent slipping also dampens a greater amount of slip in case of overload on the driven shaft so that the coupling according to the invention also operates as a torque limiting device in the transmission of torque.

Finally, this slipping is practically 100% at slow speeds so that the drag torque transmitted after declutching is almost negligible.

To permit this slipping of the ring relative to the housing within the shot wedged in the periphery of the housing by centrifugal force, it is desirable that the space included between the wall of the housing and the facing surface of the ring shall not contain small spaces in which the shot would be susceptible to be jammed.

It is, however, desirable in order to increase the torque which can be transmitted, to increase the surface of the ring (and probably also the housing) in contact with the shot and to increase the pressure of contact of the shot against this ring (and also against the housing).

To increase the surface in contact one can roughen (for instance by metal spray) the surface of the ring and also of the housing, or provide this ring with small local deformations of a rounded form (for instance by hammering).

In order to increase the pressure of the wedging a disc can be used in which the periphery contains slight undulations on condition that the amplitude of these undulations does not exceed about 15% of their length so as to avoid the jamming of the shot.

One can obtain an elastic connection between the hub and the disc in many different ways.

In one advantageous form of the invention this elastic connection can be obtained by means of coil springs in an oblique position, of which the ends are attached respectively to the disc and the hub.

The description which follows regarding the attached drawings, given as an example and not limiting the invention, will make clear how the invention can be made practical, the details which emerge from the drawing and the text are to be considered part of this invention.

Figure 1:
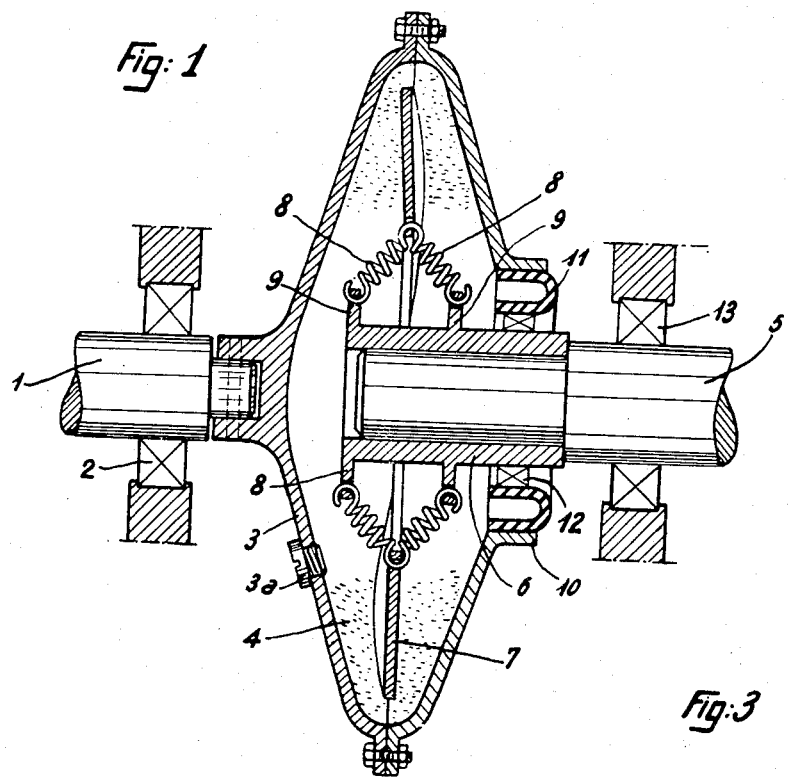
Figure 1 is an axial cross-section of a coupling device according to the invention.

On Figure 1 a shaft 1 (generally the motor shaft) is mounted on exterior bearings, is attached at its end to housing 3. The cross-section of this housing diminishes towards the periphery so that the shot 4 placed in the housing through the opening closed by plug 3A is strongly wedged at the periphery of the housing due to the action of centrifugal force when the shaft 1 is rotated. Inside the housing there is a rotor connected to shaft 5 (generally the shaft of the driven machine) also carried by exterior bearings 13. The rotor consists essentially of a hub 6 and an essentially flat ring 7 attached by elastic means. In these figures this ring is shown to be round. It could, however, without difficulty be of a polygonal form either at its outside or inside edge.

The elastic members are made up preferably by coil springs 8, of which one end is attached to the hub and the other to the ring.

Figure 2:
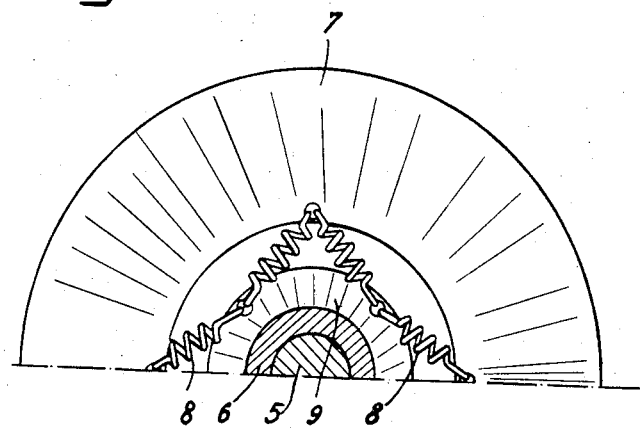
Figure 2 shows a plan of half of the central part of the device.

To provide axial rigidity at assembly it is desirable, as shown in these drawings, to attach the ends of the springs 8 to two fastenings 9 which are part of the hub and which are mounted around the hub. Moreover, the springs 8 can advantageously be disposed obliquely with reference to the radial direction, as shown in Figure 2, in such a way that the assembly of these springs is similar to the spokes of a bicycle wheel. As the ring tends by centrifugal force to center itself in the housing, these springs permit the hub to occupy a position which need not be completely concentric to the axis of the housing. The axis of the hub can thus form an angle with that of the housing or could even be out of parallel without disturbing the operation of the device. In other words, it is not necessary to have perfect alignment between bearings 2 and 13. The opening 10 which permits the hub to enter the housing is finished with a flexible seal 11, of which the internal edge can rub directly on the external surface of the hub. Preferably, however, to reduce wear, a small sealed ball bearing 12 can be mounted between these two parts. When the motor turning the shaft 1 is started, the shot, being free inside the housing, immediately accelerates and turns the housing 3. The shot thrown out by centrifugal force comes into contact with the ring and the forces of friction between the shot and the ring increased by the pressure due to the protrusions in this ring provide a smooth gradual acceleration of the rotor and consequently of the driven shaft 5 through the springs 8.

To increase the friction between the shot and the surfaces of the ring, these surfaces can be locally deformed or covered by metallization with a rough hard surface. The same treatment can be applied to the internal surface of the housing.

Figure 3:
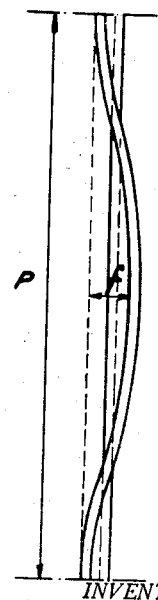
Figure 3 is a detail of the periphery of the disc using the device shown in these drawings.

To increase the pressure which the shot imposes on ring, one can, as shown in Figure 3, provide the ring with slight undulations. However, to avoid wedging the shot in the housing to the extent that it would avoid the very slight slipping desired between the housing and the rotor, these undulations should be slight.

It is desirable, as shown in Figure 3, that the "F" dimensions, which is to say, the amplitude of one undulation, should be a small fraction of the length or pitch "P" dimensions of the undulation, preferably less than 15%. Thus the rotor contains a limited number of undulations (3 to 8 at the most).

Obviously modifications can be made to the details of these drawings, especially by the substitution of equivalent technical means, without thereby departing from the framework of the present invention.

I claim:

1. A powder coupling device comprising a housing in which the width of the axial cross-section diminishes toward the periphery, which housing is supported by at least one bearing positioned outside the housing, metal shot contained in the said housing, a substantially flat disc which is slightly undulated at the periphery, the depth of these undulations being less than fifteen percent (15%) of their length so that the disc has a very slight continuous slip during operation, the said hub being also supported by at least one bearing positioned outside the housing and a flexible seal which closes the space between the hub and the opening in the housing through which the hub fits.

2. A powder coupling device according to claim 1 in which elastic members connect the disc to the hub and consist of coil springs of which one end is attached to the central end of the disc and the other to the periphery of the hub.

3. A powder coupling device according to claim 2 in which the springs are arranged obliquely both with respect to the plane of the disc and with respect to the radius of the disc.

References Cited in the file of this patent

UNITED STATES PATENTS

| | | |
|---|---|---|
| 1,850,564 | Rudqvist | Nov. 3, 1931 |
| 1,901,988 | Rudqvist | Mar. 21, 1933 |
| 2,760,360 | Binder | Aug. 28, 1956 |
| 2,772,762 | Gamundi et al. | Dec. 4, 1956 |
| 2,775,105 | Banker | Dec. 25, 1956 |
| 2,813,606 | Badin | Nov. 19, 1957 |
| 2,837,191 | Terry | June 3, 1958 |

FOREIGN PATENTS

| | | |
|---|---|---|
| 380,346 | Great Britain | Sept. 15, 1932 |
| 722,287 | Great Britain | Jan. 19, 1955 |
| 65,316 | France | Oct. 5, 1955 |